United States Patent [19]

Blanchet

[11] Patent Number: 4,811,507
[45] Date of Patent: Mar. 14, 1989

[54] APPARATUS FOR THE DISPLAY OF ILLUMINATED TRANSLUCENT DOCUMENTS

[76] Inventor: Pierre A. Blanchet, Avenue du 11 novembre, 87250 Bessines, France

[21] Appl. No.: 37,604

[22] Filed: Apr. 13, 1987

[30] Foreign Application Priority Data

Apr. 18, 1986 [FR] France ............... 86 05626

[51] Int. Cl.⁴ .............................. G09F 13/18
[52] U.S. Cl. .......................... 40/546; 362/31
[58] Field of Search .......... 40/546, 563; 362/26, 362/27, 29, 30, 31, 328

[56] References Cited

U.S. PATENT DOCUMENTS

| | | | |
|---|---|---|---|
| 3,043,947 | 7/1962 | Albinger, Jr. | 40/546 |
| 3,241,256 | 3/1966 | Viret et al. | 40/546 |
| 3,328,570 | 6/1967 | Balchunas | 362/31 |
| 4,373,282 | 2/1983 | Wragg | 40/546 |
| 4,621,306 | 11/1986 | Sell | 362/31 |

FOREIGN PATENT DOCUMENTS

| | | |
|---|---|---|
| 2511030 | 12/1975 | Fed. Rep. of Germany . |
| 30346 | 3/1926 | France . |
| 523706 | 9/1940 | United Kingdom . |
| 2017997 | 10/1979 | United Kingdom . |

*Primary Examiner*—Robert P. Swiatek
*Assistant Examiner*—Cary E. Stone
*Attorney, Agent, or Firm*—McAulay, Fields, Fisher, Goldstein & Nissen

[57] ABSTRACT

A device for a front lit illuminated panel for the directional illuminated of a display surface having at least one luminous source emitting a light flux which penetrates into a plate of transparent material and exits after encountering striations whose depth increases as a viewer observing the display moves away from the light source lighting the field of the plate. The individual striations are distributed along lines parallel to the lighted field of the plate, while being spaced from one another on each line. The length of the increased striations along their respective lines increase and the space along the same line, between individual striations, decrease as a viewer observing the display moves away from the light source.

18 Claims, 2 Drawing Sheets

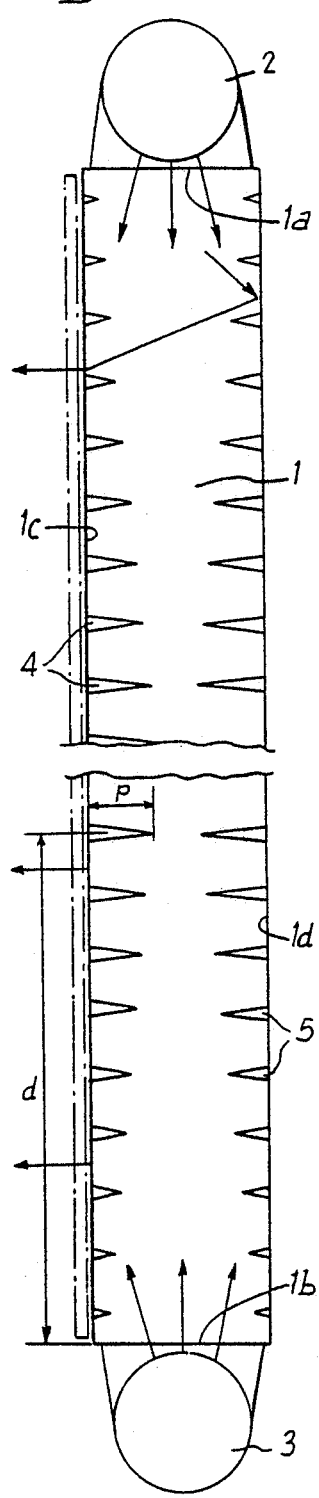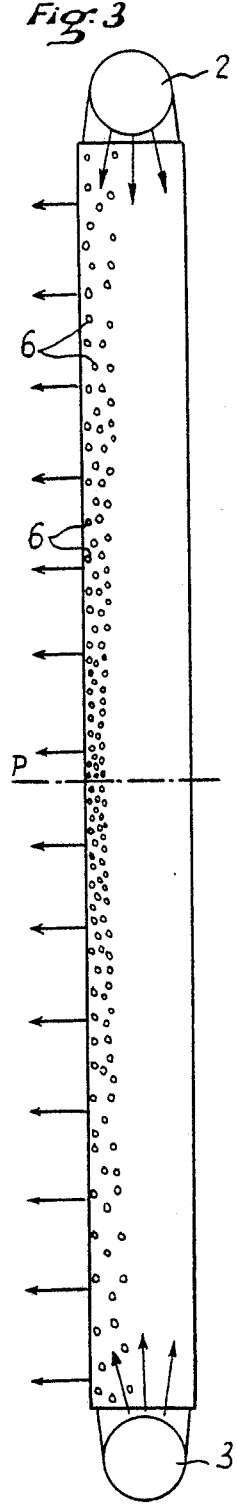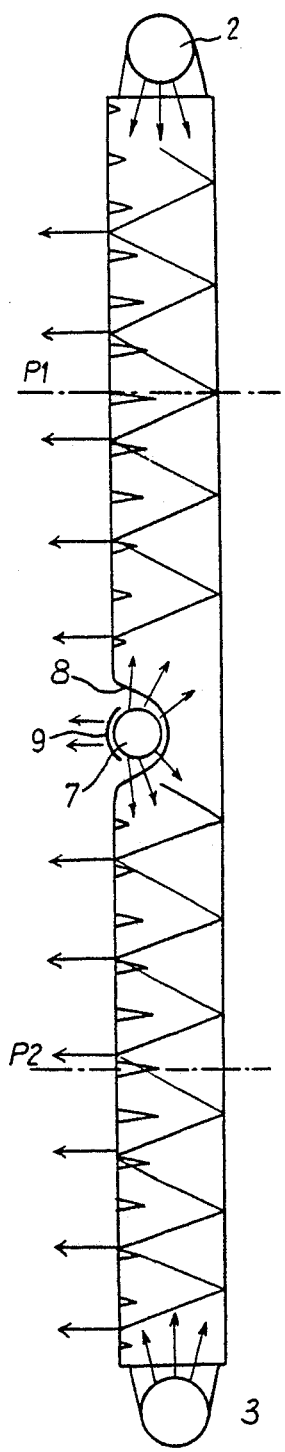

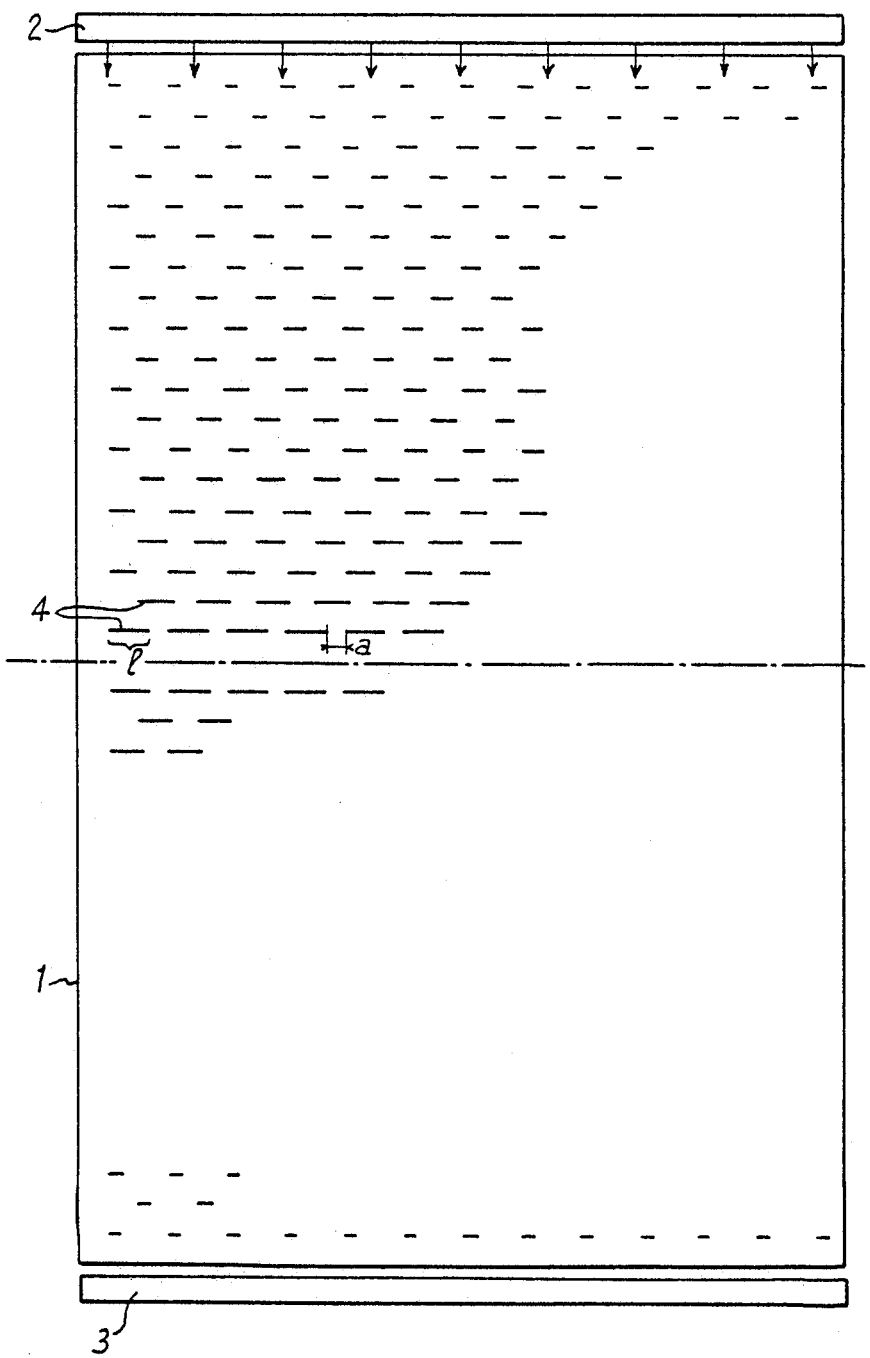

though it is not limiting, describing the best modes contemplated for carrying out the invention.

APPARATUS FOR THE DISPLAY OF ILLUMINATED TRANSLUCENT DOCUMENTS

FIELD OF THE INVENTION

The present invention is converned with a front lit, illuminated panel for the directional illumination of a display surface for posting of translucent documents comprising at least one source of light emitting a light flux which penetrates in a plate of transparent material adding a high refraction index, travels therein by total reflection and comes out through re-emitting lighting elements such as depressions, inserts, reliefs or cavities forming broken diopters, in order to light by transparency a display surface comprising a translucent document placed on the front surface of the plate.

STATEMENT OF PRIOR DISCLOSURES

Already known are devices of this type such as those described in Patents GB-A-2 017 997, U.S. Pat. No. 4,373,282 and FR-E-30 346.

The device of U.S. Pat. No. 4,373,282 is a front-lit illuminated panel for directional illumination of a display surface which comprises an optical substrate having first and second parallel opposing major surfaces with the first major surface having a multiplicity of irregular depressions thereon and an optically transparent material having an index of refraction closely matching that of the substrate and partially filling the depressions in the substrate so as to give each of the depressions a regular concave, meniscus-shaped surface, each of the depressions having gently sloping sides and a relatively shallow, sloped angle to the first surface so that light from the interior of the substrate is selectively aimed through either the first or second major surface; the light exiting through the first major surface being directed towards a display surface coextensive with and adjacent to the first major surface and the light exiting the second major surface being directed away from a viewer observing the display through the substrate.

An important object of the present invention is concerned with improvements in such illuminating devices for the purpose of improving the uniformity of the distribution of the light flux along the entire surface of the device. Other objects will in part be obvious or disclosed hereinafter.

To this effect, this device includes at least one light source which emits a light flux penetrating in a plate of transparent material and which comes out of it after having encountered elements which re-emit light such depressions, inserts, inclusions, reliefs or cavities, in order to light by transparency a display comprising a translucent document placed on the front surface of the plate, the elements re-emitting light carried by the plate being arranged and/or distributed in such a way that their light re-emitting power increases as a viewer observing the display moves from the light source, and carrying on at least one of its front and rear surfaces, striations whose depth increases as a viewer moves away from the light source lighting the field of the plate, is characterized in that the striations individually are distributed in lines parallel to the lighted field of the plate, while being spaced from one another on each line, the length of the individual striations along their respective lines increasing and the space along the same line, between individual striations diminishing as a viewer observing moves away from the luminous source.

BRIEF DESCRIPTION OF THE DRAWING

There will be described hereafter, by way of non-limiting example, embodiments of the present invention, reference being had to the accompanying drawing on which:

FIG. 1 is a vertical cross-sectional view of a device according to the invention.

FIG. 2 is an elevational view of the device of FIG. 1.

FIGS. 3 and 4 are vertical cross-sectional views of modifications of the device according to the invention.

DISCLOSURE OF BEST MODE OF THE INVENTION

The device according to the invention which is shown in FIGS. 1 and 2 comprises a rectangular plate 1, of a transparent material with high index of refraction. On its two opposite fields $1a$ and $1b$, are mounted two tubular lamps 2 and 3 which emit luminous fluxes which penetrate vertically, respectively toward the top and the bottom, aimed to plate 1, through its respectives $1a$ and $1b$. These luminous fluxes travel inside plate 1, by total reflection, while decreasing progressively in the direction of the horizontal plane of symmetry P of the device. The refracted luminous flux which exits from the front surface $1c$ of the plate, is used to light by transparency a translucent document shown by dotted lines on FIG. 1, which is applied on the front surface $1c$ of plate 1.

The transparent plate 1 is provided, on its rear surface $1c$, with depressions or striations 4 which are distributed up and down on this front surface $1c$, these striations acting the role of light re-emitting elements.

These striations 4, which extend horizontally as can be seen on FIG. 2, have a depth p which increases in the direction of the horizontal plane of symmetry P of the device; in other words, this depth increases with the distance d of the striations 4 with respect to lamp 2, 3 which is closer, that is to field $1a$ or $1b$.

This characteristic makes it possible to obtain a uniform distribution on the front surface $1c$, of the light emitted by the two lamps 2, 3.

The device according to the invention advantageously also comprises depressions or striations 5 on the rear surface $1d$ of the transparent plate 1. These striations 5 contribute also to the obtaining of a uniform distribution of light in plate 1.

Striations 4 and 5 are distributed in super-imposed horizontal lines and are spaced from one another on each line horizontally. Each of these striations has a length l and is separated from neighboring striations by a distance a. The length l of the individual striations 4 and 5 increases as one goes away from luminous sources 2 and 3, toward the central plane of symmetry P, and the horizontal a between the individual striations decreases in that direction.

Striations 4 and 5 preferably are dephased from one another, from one horizontal line to the next, to avoid causing a shadow.

In the embodiment of the invention shown on FIG. 3 the light re-emitting elements provided in the transparent plate are constituted by inserts 6, such as microballs or microbubbles. These inserts 6 then are distributed in the plate in such a way that their density increases from the light sources 2, 3 toward the plane of symmetry P of the device.

According to another embodiment, shown on FIG. 4, which is useful for a panel of large dimension, this panel comprises an intermediate tubular lamp 7 parallel to two outer lamps 2, 3 in which is housed in a group 8 formed in the front surface 1c (or rear 1d). In this case the striations 4, 5 or other elements are distributed as before, with a symmetrical arrangement relative to two horizontal planes P1, P2, located, respectively half-way between intermediate lamp 7 and outer lamps 2, 3.

The panel or plate 1 may also be provided with both striations 4, 5 as shown in FIG. 1 and light re-emitting elements as shown in FIG. 3. The individual striations are dephased with respect to one another from one line of striations to the next.

The re-emitting elements 6 are distributed in such a way that their light re-emitting power increases as the distance away from the light source increases.

Additionally a translucent screen 9 advantageously is positioned in front of intermediate lamp 7 in order to allow a part of the luminous flux emitted by lamp 7 to pass directly towards the front.

In all the embodiments of the invention above described, the device can optionally be completed by a reflective surface (mirror, white paper) positioned against its rear surface 1d.

I claim:

1. In a front lit illuminated panel for directional illumination of a translucent display, comprising:
at least one light source emitting a light flux;
a plate of transparent material including striations and having light re-emitting elements, said light re-emitting elements re-emitting flux meeting said elements from said at least one light source and exiting from said plate of transparent material to light said display;
said light re-emitting elements in said plate being arranged and/or distributed in such a way that their light re-emitting power increases as the distance away from the light source increases; and
said plate having on at least one of its front and back surfaces striations whose depth increases in a direction as the distance away from said light source increases; and wherein
the improvement consists essentially in that said striations are individual and distributed along lines parallel to a lighted field of the plate and spaced from one another on each of said lines, the length (l) of said striations along the respective lines increasing and the space (a) along the same line between said individual striations decreasing in the direction away from a viewer observing said display.

2. The device according to claim 1, wherein said individual striations are dephased with respect to one another, from one line of striations to the next.

3. The device according to claim 2, wherein said light re-emitting elements are constituted by inserts, said inserts being distributed in said plate in such a way that their density increases from said light source towards the plane of symmetry (p) of the device.

4. The device according to claim 2, also having individual striations similarly arranged on the front and on the rear surface of said plate.

5. The device according to claim 4, comprising an intermediate light source and two outer light sources, said intermediate light source being parallel to said outer light sources and housed in a groove formed in the front or rear surface of said plate, said individual striations being distributed symmetrically relative to two horizontal planes located, respectively, midway between said intermediate light source and said outer light source.

6. The device according to claim 5, further having a translucent screen mounted in front of said intermediate light source.

7. The device according to claim 1, wherein said light re-emitting elements are constituted by inserts, said inserts being distributed in said plate in such a way that their density increases from said light source toward the plane of symmetry (p) of the device.

8. The device of claim 7, wherein said inserts consist of microspheres or microbubbles.

9. The device according to claim 7, comprising an intermediate light source and two outer light sources, said intermediate light source being parallel to said outer light sources and housed in a groove formed in the front or rear surface of said plate, said individual striations being distributed symmetrically relative to two horizontal planes located, respectively, midway between said intermediate light source and said outer light sources.

10. The device according to claim 9, further having a translucent screen mounted in front of said intermediate light source.

11. The device according to claim 4, also having individual striations similarly arranged on the front and on the rear surface of said plate.

12. In a front lit panel as claimed in claim 1, having at least two light sources and said plate of transparent material having a central plane of symmetry and said light sources being placed at opposite ends of said plate from said central plane of symmetry, and wherein the length of said striations along their respective lines increases as the distance increases from the respective said light source towards said central plane of symmetry and the horizontal space (a) along the same line between said individual striations decreases in that direction.

13. A front lit illuminated panel for directional illumination of a translucent display, comprising:
at least one light source;
a plate of transparent material having light re-emitting elements;
said light source emitting flux meeting said re-emitting elements and exiting from said plate to light said translucent display through said plate of transparent material;
said light re-emitting elements being distributed in the plate such that their light re-emitting power increases as the distance away from the light source increases;
said plate having, on at least one of its front and back surfaces, striations whose depth increases in a direction as the distance away from said light source increases; and
said striations are individual and are distributed along lines parallel to the lighted field of the plate and spaced from one another on each of said lines, the length (l) of said striations along the respective lines increasing and the space (a) along the same line between said individual striations decreasing in the direction away from a viewer observing said display.

14. The panel of claim 13, wherein the striations have a depth p which increases in the direction of a plane of symmetry of said plate of transparent material.

15. The panel of claim 14, including two light sources, one at each end of said plate of transparent material.

16. The panel of claim 15, wherein said plate of transparent material has a central plane of symmetry, and the length of said striations along their respective lines increases as the distance increases from said light source towards said central plane of symmetry and the horizontal space (a) along the same line between said individual striations decreases in that direction.

17. The panel of claim 13, including two light sources, one at each end of said plate of transparent material.

18. The panel of claim 13, wherein said plate of transparent material has a centrl plane of symmetry, and the length of said striations along their respective lines increases as the distance increases from said light source towards said central plane of symmetry and the horizontal space (a) along the same line between said individual striations decreases in that direction.

* * * * *